July 25, 1961     J. A. POKRYFKE ET AL     2,993,503
HOSE CLAMPING DEVICE
Filed May 8, 1958                             2 Sheets-Sheet 1
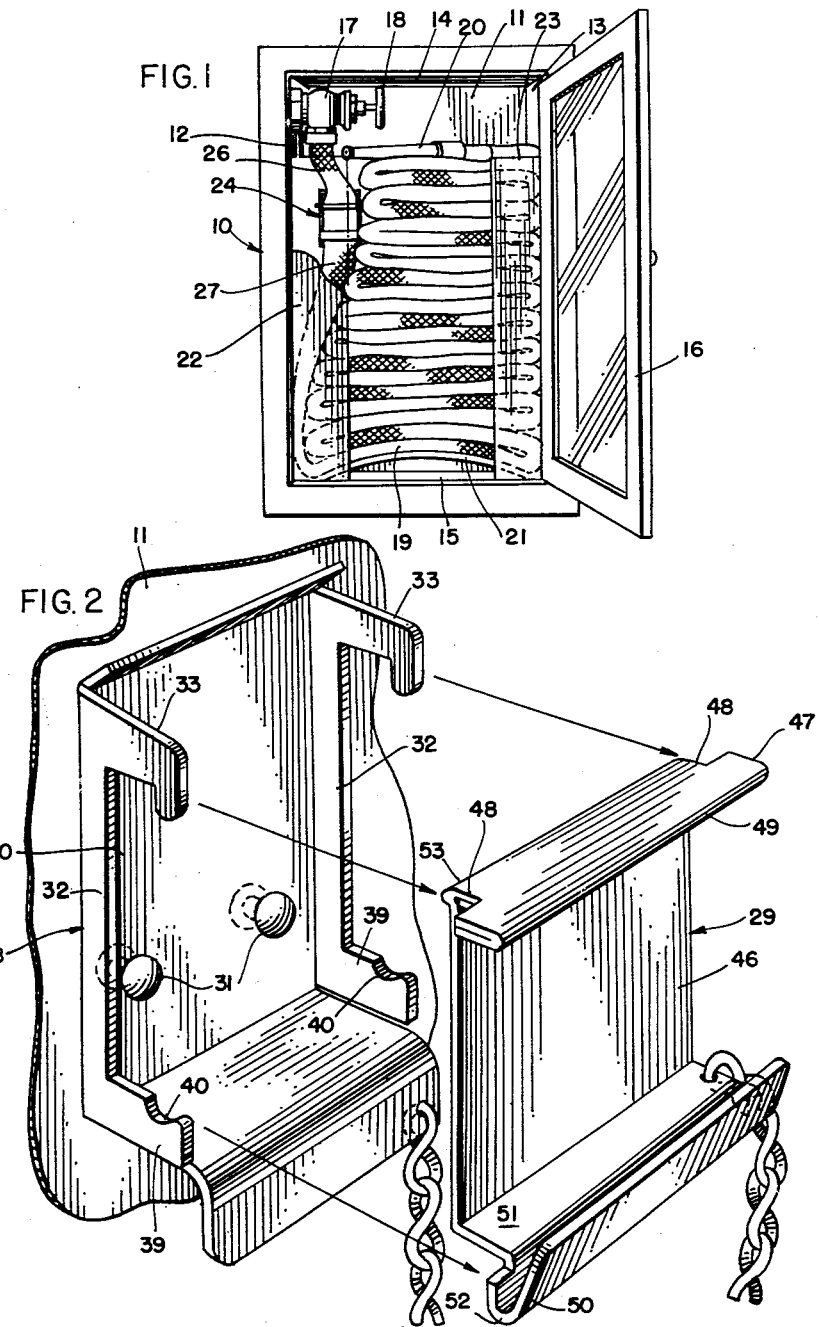
INVENTORS:
JOHN A. POKRYFKE
JOSEPH J. TUREK
BY
ATT'YS July 25, 1961 J. A. POKRYFKE ET AL 2,993,503
HOSE CLAMPING DEVICE
Filed May 8, 1958 2 Sheets-Sheet 2
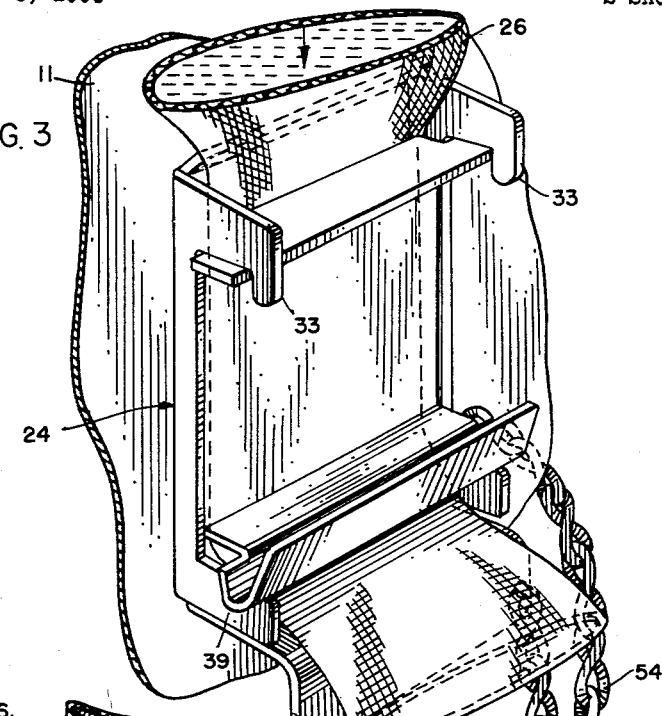
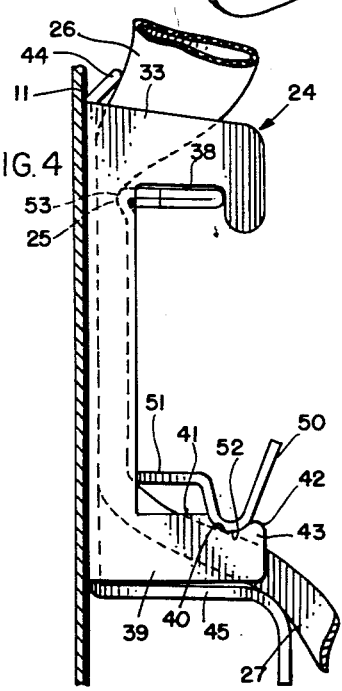
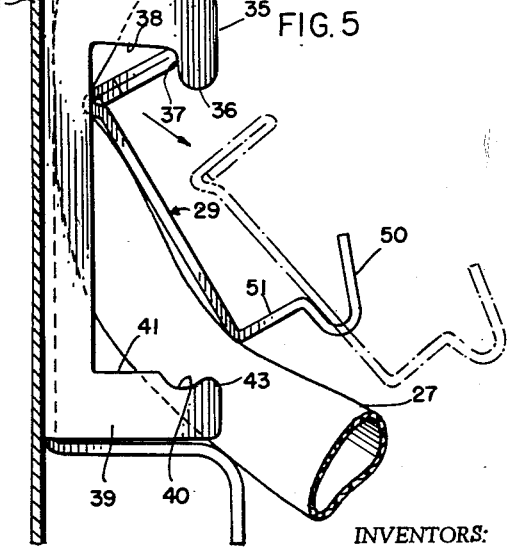
INVENTORS:
JOHN A. POKRYFKE
JOSEPH J. TUREK
BY
ATT'YS United States Patent Office 2,993,503
Patented July 25, 1961

2,993,503
HOSE CLAMPING DEVICE
John A. Pokryfke, Villa Park, and Joseph J. Turek, Riverside, Ill., assignors to W. D. Allen Manufacturing Co., Chicago, Ill., a corporation of Illinois
Filed May 8, 1958, Ser. No. 733,855
7 Claims. (Cl. 137—355.18)

This invention relates to a device for clamping or pinching collapsible hose, and more particularly to a hose clamping device adapted to be employed with a fire hose storage cabinet or rack for clamping or pinching the hose adjacent the source of water.

It is common to provide for the storage of fire hose connected to water standpipes at various locations in commercial building structures. It is also conventional to store collapsed fire hose in a cabinet having a door for opening same or on a rack mounted on a wall. One of the methods of storing collapsed hose is to stack the hose by folding it back and forth on itself on a rack within a cabinet. Heretofore, the "Underwriters Laboratories" would not approve this method of storing fire hose in the cabinet structure because it did not include means for clamping the hose to hold back the water while running the hose to a fire location. The purpose of a hose clamping device is to clamp or pinch the collapsible hose adjacent the water standpipe, whereby a user could initially open the valve at the standpipe so the water would flow only as far as the clamping device, remove the hose from the cabinet and convey the nozzle to the place where it is to be used, and by giving a yank on the hose actuate the clamping device to permit the flow of water through the hose.

Accordingly, it is an object of this invention to provide a clamping device for use with a fire hose cabinet or a hose storage rack mounted on a wall.

Another object of this invention resides in the provision of a hose clamping device to be mounted in a fire hose cabinet, wherein the fire hose is stacked back and forth upon itself on a support rack.

Still another object of this invention is in the provision of a hose clamping device to be mounted in any existing fire hose cabinet or in new fire hose cabinets for the purpose of obtaining approval by the "Underwriters Laboratories."

A further object of this invention is to provide a hose clamping device for clamping a portion of collapsible hose in a fire storage cabinet adjacent the water standpipe to prevent the flow of water through the entire length of the hose until the hose extending from the end of the device remote from the end of the standpipe is jerked or yanked to release the clamping of the hose and permit the water to flow throughout the hose length.

A still further object of this invention is to provide a hose clamping device including a pair of coacting members for clamping a collapsible hose and preventing the flow of water therethrough which are separable by yanking of the hose at one end thereof.

Other objects, features, and advantages of the invention will be apparent from the following detailed disclosure, taken in conjunction with the accompanying sheets of drawings, wherein like reference numerals refer to like parts, in which:

FIG. 1 is a front perspective view of a fire hose cabinet, with parts broken away to show underlying parts, and embodying the invention;

FIG. 2 is an enlarged, exploded perspective view of the hose clamping device according to the invention;

FIG. 3 is an enlarged perspective view of the hose clamping device assembled to stop the flow of water through a hose by clamping same;

FIG. 4 is a side elevational view of the hose clamping device of FIG. 3; and

FIG. 5 is a side elevational view of the hose clamping device but showing the parts in another position wherein the separable member is partially removed.

To illustrate the invention, the drawings show a fire hose storage cabinet 10, FIG. 1, of the type that may be used to contain stacked fire hose and recessed in the wall of a building. This cabinet includes a back wall 11, side walls 12 and 13, a top wall 14, and a bottom wall 15. A door 16 is hinged to the cabinet for closing the front open end of the cabinet, although it may be appreciated that it is not necessary to have a door in all instances. A water standpipe or hydrant 17 is mounted within the cabinet and connected to a source of pressurized water. By opening the standpipe through manipulation of the handle 18, water will be delivered to the fire hose. The storage cabinet 10 may be recessed within a wall or mounted on the outside of the wall depending upon the desire of the user.

A collapsible fire hose 19 is connected at one end to the standpipe and provided with a nozzle at the other end. This fire hose is stacked back and forth upon itself on an arcuate support plate 21 mounted on a bottom wall 15 in the cabinet. Further, the hose is arranged behind inwardly extending retaining flanges 22 and 23 which prevent the hose from falling out of the storage cabinet.

Mounted on the back wall 11 of the cabinet and adjacent to the standpipe 17 is a hose clamping or pinching device 24 constructed in accordance with the present invention which tightly clamps or pinches the hose at 25, to separate intercommunication between the hose portion 26 extending between the device and the standpipe and the hose portion 27 which leads to stacked hose within the cabinet. Although the present invention is illustrated with one form of hose storage means, a cabinet recessed in a wall, the present invention may be employed with any other type of cabinet, or with any type of hose storage rack mounted on a wall or support.

Referring particularly to FIGS. 2 to 5, the hose clamping device includes generally a fixed member 28 mounted on the back wall 11 of the cabinet and a movable member 29 which coacts with the fixed member to clamp the hose therebetween. The fixed member 28 includes a back wall 30 intimately engaging the back wall 11 of the cabinet and secured thereto by fasteners 31. The back wall 30 is generally rectangular in shape, but need only be right-angle polygonally shaped. Projected forwardly from the opposite vertical edges of the back wall 30 are side walls or flanges 32, 32 which define with the back wall a trough or hose receiving area. Extending forwardly from the upper end of the side walls 32 are a pair of down-turned hooks, 33, 33. The hooks are intgeral with the side walls and are defined by an upper edge 34 extending downwardly away from the side walls and merging with a vertical edge 35, FIG. 5. This vertical edge blends into a rounded or arcuate lip 36 which continues to a substantially vertical edge 37 paralleling the edge 35. Extending rearwardly from the edge 37 and slightly upwardly to the forward edge of the side wall is a lower edge 38.

At the lower ends of the side walls 32, forwardly extending lugs 39, 39 are arranged to face oppositely the hooks 33, 33. Each lug 39 is provided adjacent its free end with a concave seat 40. This seat 40 extends from the upper substantially horizontal edge 41 to an outer rounded or arcuate edge 42 which defines a protuberance 43. It may be noted particularly in FIGS. 4 and 5, that the upper end of the protuberance 43 is at a level slightly lower than the upper edge 41.

Extending upwardly and forwardly from the upper edge of the back wall 30 is a guide bar 44 which holds the hose portion 46 slightly away from the back wall 40 for reasons to be presently discussed. A guide bar 45 extends outwardly and downwardly from the bottom edge of the back wall 30 to position the hose portion 27 relative to the lower end of the clamping device at a specific location for reasons to be presently discussed.

The removable or movable member 29 which coacts with the fixed member 28 includes a main body portion 46, right-polygonal in shape, and is sized to be received between the opposing side walls 32 of the fixed member 28 as seen in FIGS. 3 and 4. A transversely extending arm 47 is connected to the upper edge of the body 46 and of a width greater than the width of the fixed member 28. This arm 47 is cut away at opposite ends adjacent to the connection to the body 46 as indicated at 48 for clearance purposes and is rounded at its outer forward edge 49 to facilitate operation of the device.

Connected to the lower edge of the body 46 is a lower arm 50 which is spaced from the body by a spacing plate 51 of the same width as the body. The arm 50 is substantially U-shaped and of a greater width than the width of the fixed member 28. The arm 50 includes a lower convex face 52 which is adapted to fit in the seats 40 of the fixed member 28. It may also be noted that the spacer plate 51 has its forward edge connected to the upper inner end of the arm 50, whereby it is spaced from the upper edges 41 of the lugs 39 when in assembled position as seen in FIG. 4 for clearance purposes.

While the body 46 of the movable member 29 serves to effectively clamp or squeeze the collapsible hose against the back wall 30 of the fixed member 28, a clamping ridge or projection 53 extends transversely of the body 46 at the upper edge thereof and inwardly toward the back wall 30 to define a restricted opening between the back wall 30 and the movable member 29 for tightly clamping the hose at 25, FIG. 4.

It will be appreciated that the clamping device 24 may be now installed in existing fire storage cabinets so that these cabinets may be approved by the "Underwriters Laboratories" or the clamping device may be installed in all new cabinets or in association with existing installations storing hose on racks. When initially placing the clamping device in use, the collapsible hose will be laid along the stationary member 28 between the side walls 32. The movable member 29 is then inserted by first placing the upper arm 49 into engagement with the hooks 33 and so the clamping ridge 53 and body 46 will be received within the side walls of the fixed member. The first step of insertion of the movable member 28 will approach that as seen in FIG. 5 in solid lines. The lower arm 50 is then urged inwardly so that the rounded edge 49 pivots against the hook edges 38 and 37 until the convex face 52 on the lower arm 50 is received in the seats 40 of the fixed member 28. This will cause the hose to be clamped at the area 25 to prevent the flow of water therethrough, and the inherent resiliency of the hose will force the upper end of the movable member 28 outwardly so that the rounded forward edge 49 of the upper bar 47 engages the inside edges 37 of the hooks 33 as seen in FIG. 4.

Should the hose be needed for use, the user would go to the cabinet, open the door 16, turn on the water at the standpipe 17 and proceed to remove the hose from the cabinet. Water will then flow to the clamped area 25, whereby the hose portion 26 will be filled with water. The pressurized water in the hose portion 26 will expand it and exert a force downwardly and outwardly against the pinching ridge 53 of the movable member 29 to firmly lock the movable member 29 in place. The upper guide bar 44 on the fixed member 28 serves to urge the water filled hose portion 26 outwardly so that it will produce a downward force on the movable member 29. It may then be noted that the hose portion 27 engages the convex face 52 of the lower arm 50 on the movable member 29 by virtue of its being positioned thereagainst by the guide bar 45. When the user has reached the place of use for the hose and removed the hose from the cabinet, he need only jerk or yank the hose whereby the jerk will be transmitted to the hose portion 27 and exert a pressure upwardly against the convex face of the lower arm 50 and outwardly to unlock the movable member 29 from the fixed member 28.

It will be noted that the minimum depth of the seat 40 relative to the protuberance 43 must be slightly less than the clearance between the upper surface of the upper arm 47 and the lower edges 38 of the hooks 33 in order for the convex face 52 to slide over the protuberance 43. Once the lower arm 50 has been unseated, the water pressure will aid in further removing the movable member 29 from the fixed member 28 and permit full flow of water through the hose. Actually, the movable member 29 will be given such a momentum that it will tend to fly from the fixed member 28, and therefore in order to prevent loss of the movable member, a chain or other flexible retaining element 54 is provided having one end connected to the stationary or fixed member 28 and the other end connected to the movable member 29.

The hose clamping device 24 is preferably made from a non-corrosive metal such as brass, although it may be made from steel, or plastic, such as nylon if specifications permit. Preferably, the fixed member 28 will be made from a single piece of material and the movable member 29 will be made from a single piece of material so that all of the elements in each member will be integral.

It will be understood that modifications and variations may be effected without departing from the scope of the novel concepts of the present invention, but it is understood that this application is to be limited only by the scope of the appended claims.

The invention is hereby claimed as follows.

1. In combination with a fire hose cabinet for storing stacked collapsible hose and a standpipe in said cabinet, a device for clamping hose adjacent the standpipe to prevent water flow therethrough, said device comprising a trough-shaped member rigidly mounted within the cabinet adjacent the standpipe, a plate-shaped member coacting with said trough-shaped member to clamp the hose therebetween and prevent the flow of water therethrough, said members having coacting locking parts for maintaining said plate-shaped member locked to said trough-shaped member when the plate-shaped member is in one position relative to said trough-shaped member but providing for said plate-shaped member to be displaced relative to said trough-shaped member to another position to disable said coacting locking parts and enable said members to completely separate in response to jerking of hose extending from the end of the device remote from the standpipe.

2. In combination with a fire hose cabinet for storing stacked collapsible hose and a standpipe in said cabinet, a device for clamping hose adjacent the standpipe to prevent water flow therethrough, said device comprising a trough-shaped member rigidly mounted within the cabinet adjacent the standpipe, a plate-shaped member coacting with said trough-shaped member to clamp hose therebetween, said plate-shaped member having a ridge on the side facing the trough-shaped member to define a restricted opening therebetween and clamp hose to prevent the flow of water therethrough, said members having coacting locking parts for maintaining said plate-shaped member locked to said trough-shaped member when the plate-shaped member is in one position relative to said trough-shaped member but providing for said plate-shaped member to be displaced relative to said trough-shaped member to another position to disable said coacting locking parts and enable said members to completely separate in response to jerking of hose extending from the end of the device remote from the standpipe.

3. In combination with a fire hose cabinet for storing stacked collapsible hose and a standpipe in said cabinet, a device for clamping hose adjacent the standpipe to prevent water flow therethrough, said device comprising first and second members, said first member being rigidly mounted within the cabinet and having a back wall and side walls defining a trough for receiving hose, said second member having a flat plate extending substantially parallel to said back wall and a ridge extending from said plate toward said back wall for clamping hose therebetween and preventing the flow of water therethrough, and said members having coacting engaging parts for normally maintaining said second member locked to said first member when said second member is in one position relative to said first member but providing for said second member to be displaced relative to said first member to another position to disable said coacting engaging parts and enable said second member to completely separate from said first member in response to jerking of hose extending from the end of the device remote from the standpipe.

4. In combination with a fire hose cabinet for storing stacked collapsible hose and a standpipe in said cabinet, a device for clamping hose adjacent the standpipe to prevent water flow therethrough, said device comprising first and second members, said first member being rigidly mounted on the back wall of the cabinet adjacent the standpipe and having pairs of upper and lower outwardly projecting fingers defining a hose receiving channel, said second member having a body with an elongated projection facing the channel and bars extending transversely of said channel and lockingly engaging said fingers, said bars and fingers coacting to lock said second member to said first member for clamping hose therebetween and preventing the flow of water therethrough when said second member is in one position relative to said first member but permitting providing for said second member to be displaced relative to said first member to another position to disable the locking engagement of said bars and fingers and enable said second member to completely separate from said first member in response to jerking of hose extending from the end of the device remote from the standpipe.

5. In combination with a fire hose cabinet for storing stacked collapsible hose and a standpipe in said cabinet, a device for clamping hose adjacent the standpipe to prevent water flow therethrough, said device comprising coacting first and second members, said first member having a right angle polygonally shaped panel intimately engaging the back wall of the cabinet and being secured thereto, said panel having a pair of flanges extending inwardly from the opposite edges thereof and away from said back wall defining a hose receiving pocket, a pair of inverted hooks extending inwardly from the upper ends of the flanges and away from said back wall, a pair of lugs extending inwardly from the lower ends of the flanges and away from said back wall having concave seats, said second member having a flat face paralleling the panel, a projection along the side of said plate facing said panel and adapted to define a restricted opening therewith, an arm at the upper end of said plate adapted to engage said hooks, and an arm at the lower end of the plate having a convex portion adapted to be received in said seats when said second member is in one position relative to said first member, whereby said second member is retained by said first member for clamping hose therebetween and preventing the flow of water therethrough by said hooks, lugs, seats and arms but are provided upon relative displacement between said members to completely separate in response to a jerking of the hose extending from the end of the device remote from the standpipe.

6. A device for clamping collapsible hose to block the flow of liquid therethrough, said device comprising first and second members, said first member having a back wall and side walls defining a trough for receiving hose, said second member having a flat plate extending substantially parallel to said back wall and a ridge extending from said plate toward said back wall, and said members having coacting engaging parts for maintaining said second member locked to said first member for clamping hose therebetween and preventing the flow of water therethrough when said second member is in one position relative to said first member but providing for said second member to be displaced relative to said first member to another position to disable said coacting engaging parts and enable said second member to completely separate from said first member in response to jerking of hose extending from the device.

7. A device for pinching collapsible hose to block the flow of liquid therethrough, said device comprising first and second members, said first member having pairs of upper and lower outwardly projecting fingers defining a hose receiving channel, said second member having a body with an elongated projection facing the channel and bars extending transversely of said channel and lockingly engaging said fingers, said bars and fingers coacting to lock said second member to said first member for pinching hose arranged therebetween and preventing the flow of water therethrough when said second member is in one position relative to said first member but providing for said second member to be displaced relative to said first member to another position to disable the locking engagement of said bars and fingers and enable said second member to completely separate from said first member in response to jerking of hose extending from the device.

References Cited in the file of this patent

UNITED STATES PATENTS

| | | |
|---|---|---|
| 1,004,461 | Nuhring | Sept. 26, 1911 |
| 2,622,837 | Goodman | Dec. 23, 1952 |
| 2,719,752 | Dodge | Oct. 4, 1955 |
| 2,780,430 | Pokryfke | Feb. 5, 1957 |
| 2,804,092 | Aitchison | Aug. 27, 1957 |

UNITED STATES PATENT OFFICE
CERTIFICATE OF CORRECTION

Patent No. 2,993,503                                July 25, 1961

John A. Pokryfke et al.

It is hereby certified that error appears in the above numbered patent requiring correction and that the said Letters Patent should read as corrected below.

Column 5, line 55, for "face" read -- plate --; column 6, line 10, strike out "the".

Signed and sealed this 28th day of November 1961.

(SEAL)
Attest:

ERNEST W. SWIDER                              DAVID L. LADD
Attesting Officer                                Commissioner of Patents